May 23, 1933.                P. JODECK                    1,910,341
        METHOD OF SEPARATING SULPHUR DIOXIDE AND
            THE LIKE FROM LIQUID HYDROCARBONS
                 Filed Jan. 17, 1929          2 Sheets-Sheet 1
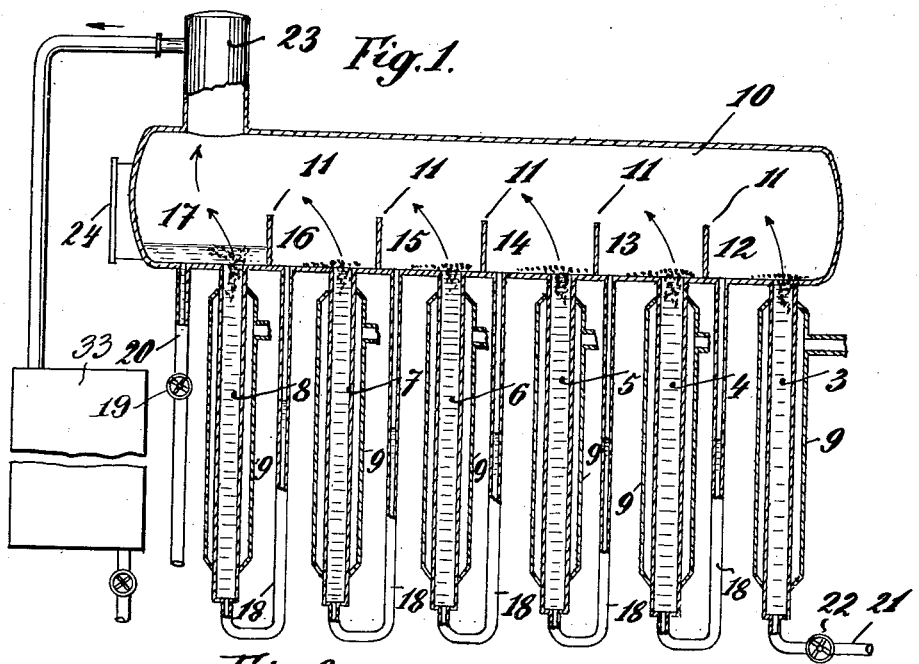
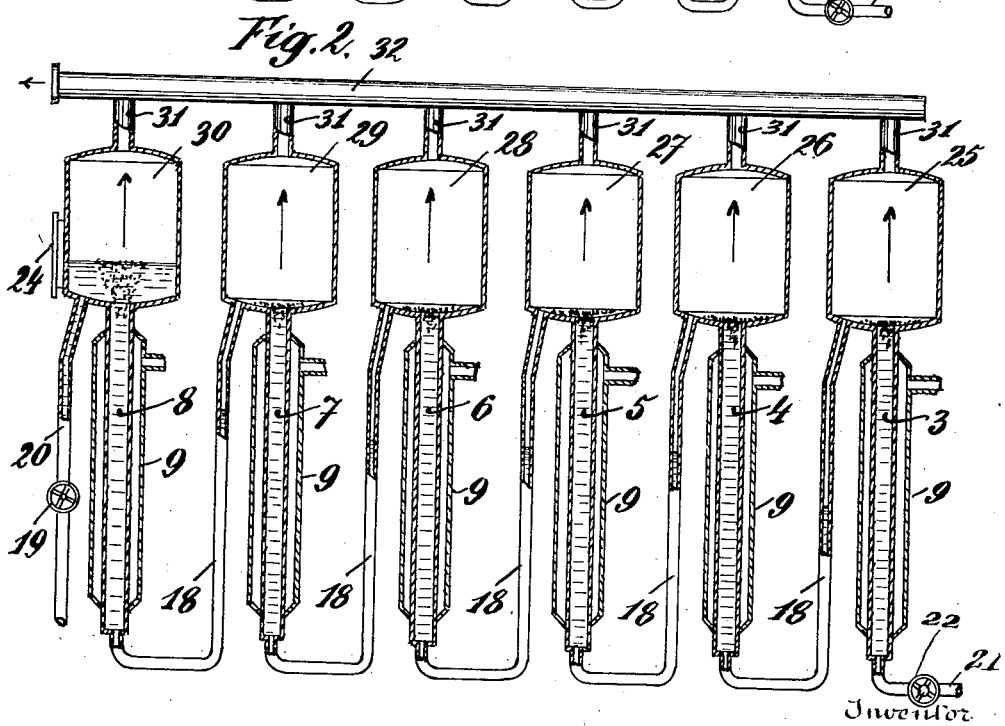

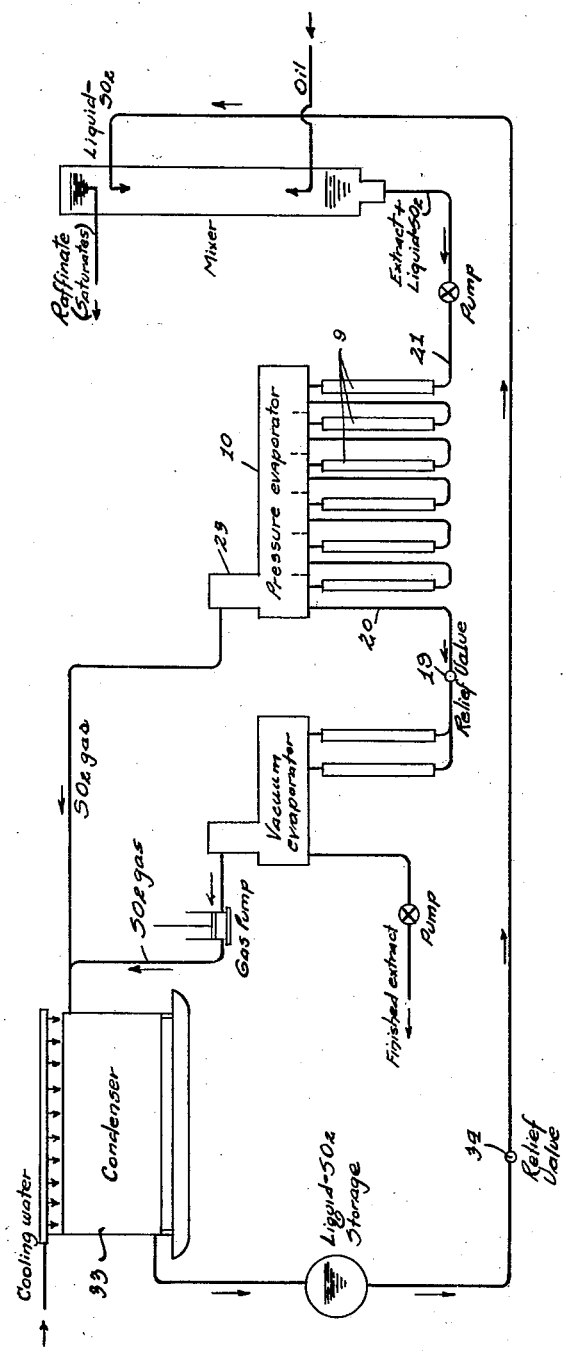

Patented May 23, 1933

1,910,341

UNITED STATES PATENT OFFICE

PAUL JODECK, OF BERLIN, GERMANY, ASSIGNOR TO EDELEANU GESELLSCHAFT M. BESCHRANKTER HAFTUNG, OF BERLIN, GERMANY

METHOD OF SEPARATING SULPHUR DIOXIDE AND THE LIKE FROM LIQUID HYDROCARBONS

Application filed January 17, 1929, Serial No. 333,207, and in Germany October 22, 1928.

This invention finds an important application in the refining of mineral oils, and aims to increase the capacity of the refining plant and decrease the cost of treatment.

In the refining of mineral oils by means of the Edeleanu process the distillate of mineral oil to be purified is treated with liquid sulphur dioxide, the unsaturated hydrocarbons contained in the distillate, the quantity of which varies according to the origin of the material under treatment, being dissolved by the liquid $SO_2$ and carried down with the latter in the form of an extract.

The recovery of the $SO_2$ used as dissolving means from the extract in a continuous operation prior to this invention has been performed in the following manner:

The mixture of extract and liquid $SO_2$ containing one part of liquid extract and about four to five parts of $SO_2$ is led through vertical tubes connected in parallel and heated by means of heating jackets, whereby the liquid $SO_2$ is evaporated in its greater part. The tubes open at their top into a container wherein the evaporated $SO_2$ is separated from the extract. The $SO_2$ gas is conducted to a water-cooled condenser and liquefied therein, the remaining extract still containing a certain quantity of $SO_2$ ($\frac{1}{4}$ to $\frac{1}{3}$ of its volume) in dissolved state. The pressure under which the evaporation takes place depends on the temperature of the cooling water of the condenser and in the most cases amounts to 3 to 4 Atm. In order to separate the remaining $SO_2$ still contained in the extract, the latter has to be led into another evaporator in which this remainder of $SO_2$ is expelled up to trifling traces both by increased temperature and decreased pressure by means of vacuum pumps. The latter suck off the greatly expanded remainder of $SO_2$ evaporated in the second evaporator and compress the $SO_2$ gas in several pressure stages into the condenser where it is likewise liquefied.

This known process, however, suffers from the drawback that the percentage of $SO_2$ still contained in the remaining extract is comparatively high, so that the dimensions of the vacuum and pressure pumps must be large and their power consumption is correspondingly high. Attempts made to reduce the percentage of $SO_2$ in the remaining extract have been ineffective because a more intense heating of the extract in the pressure evaporator was practically impossible. The reasons therefor are the following:

In the lower portion of the heating tubes in the prior practice where the $SO_2$ is by far predominating, the temperature of the mixture nearly corresponds to that of the saturated $SO_2$ vapor, that means, at a pressure in the condenser of 3 to 4 Atm. this temperature is about 30 to 35 degrees C. Only after the $SO_2$ has been evaporated from the mixture to such an extent that one part of the extract still contains about three quarters part of liquid $SO_2$, the temperature of the mixture begins rising notably. In the upper portion of the heating tubes an increased heating and great reduction of the unvaporized remainder of $SO_2$ would be possible but for the fact that the volume of the $SO_2$ already evaporated in the lower portion of said tubes at about 35 degrees C. is so great that the volume of the other liquid portion disappears in comparison therewith. This former volume amounts to about the 1000 to the 2000-fold of said latter quantity. Thus the great quantity of comparatively cool $SO_2$ vapor or gas prevents the further heating of the other, small quantity of liquid in the very short time that the mixture takes in passing through the upper portion of the tubes. The consequence thereof is that in the hitherto used apparatus the extract can be heated only up to about 45 degrees C. which is insufficient to obtain good separation.

Now the object of my invention is to overcome this drawback and to afford a process which enables the highest possible heating of the extract in the pressure evaporator to be obtained, in order to expel in this manner all the $SO_2$, whether in the liquid phase or absorbed vapor or gas excepting a quite trifling percentage.

This object is obtained primarily by subjecting the liquid to successive or stepwise increasing heating in the pressure evaporator, the $SO_2$ developed being progressively separated from the liquid and led off. This may be performed e. g. by forcing the liquid under a sustained pressure due to the vaporization through a battery of heating members connected in series and heated in stages, the $SO_2$ gas developed in one stage being separated at the passage from this stage to the next one, these gases thus successively developed then being condensed under the pressure due to vaporization. Manifestly the $SO_2$ gases expelled in this manner are no longer enabled to prevent further heating of the liquid, as they are separated therefrom shortly after having been generated, and the further heating of the liquid takes place only after the $SO_2$ vapors developed in the preceding stage have been withdrawn. In this manner it is possible to gradually heat the liquid up to about 85 degrees C. and to separate the $SO_2$ up to a quite trifling percentage, so that the final separation in vacuo may be accomplished by means of comparatively small devices and in an economical and satisfactory manner.

In the accompanying drawings, wherein I have illustrated two embodiments of apparatus intended to carry out my new process and one embodiment of my process.

Figure 1 shows the first embodiment of a pressure evaporator in longitudinal section, while Figure 2 is a similar section through the other embodiment.

Fig. 3 is a diagrammatic representation showing the apparatus illustrated in Fig. 1 used in connection with a method for recovering the liquid $SO_2$ from the unsaturates or extract derived from the liquid $SO_2$ treatment of mineral oils.

As to be seen from Figure 1, the apparatus consists of a plurality of heating members, e. g. tubes 3—8, which are surrounded by heating jackets 9 and on the top open into a common container 10. By means of partitions 11 corresponding in number less one to that of the members 3—8, and rising up to about midway of the container 10, compartments 12—17 are formed in the latter which are open on the top. Into each of these compartments opens one of the heating members 3—8, and a pipe 18 leads from the bottom of each compartment to the next heating member, an outlet pipe 20 containing a regulating valve 19 being connected to the last compartment 17.

The mixture of oil and liquid $SO_2$ is fed to the first heating member 3 from below through a pipe 21, the quantity fed being regulated by a valve 22. Under the action of the heating means, e. g. waste vapor, fed to the jacket 9, a portion of the $SO_2$ is evaporated from the liquid on its way from bottom to top, so that a mixture of $SO_2$ gas and liquid enters the compartment 12. Here the $SO_2$ gas is separated from the liquid and flows through a dome 23 to the condenser 33, which may be a water or air cooled surface condenser of known type, while the preheated liquid is fed from below to the next heating member 4 through the pipe 18. This liquid is further heated on the way from bottom to top by the heating means in jacket 9, so that a further portion of the $SO_2$ is evaporated and separated from the liquid entering the compartment 13 and fed through pipe 18 to the third heating member 5. In the latter, and in the next heating members 6 to 8, this procedure is repeated with the only difference that the liquid fed to the individual heating members, containing less and less $SO_2$, becomes hotter in each stage so that at length a temperature of about 85 degrees C. is reached in the last member 8 and the content of $SO_2$ therein is reduced to about 6 percent of weight, referred to the quantity of oil in the extract.

The oil is led off from the last compartment 17 through the pipe 20, its quantity being regulated by valve 19 in such a manner that the liquid level in compartment 17 remains constant, this being ascertained by means of a peep glass 24.

The embodiment illustrated in Figure 2 substantially corresponds to that of Figure 1, with the difference that the common container 10 is subdivided so as to form a number of individual chambers 25—30 connected by offtake pipes 31 to a common pipe 32 that leads to the condenser. In this apparatus too, the liquid extract entering from the pipe 21 below the first heating member 3 is heated in stages during its passage through the entire apparatus, the $SO_2$ gas being led off after each stage through the chambers 25—30. The discharge of extract from the last chamber 30 is controlled likewise by the valve 19 in the outlet pipe 20 to maintain the level in the chamber constant as seen through the peep glass 24. The advantage of this embodiment over that illustrated in Figure 1 substantially resides in the fact that the apparatus consists of individual small separate units and can easily be extended by adding such units.

Referring to Fig. 3, wherein I have shown diagrammatically the application of my method to the separation and recovery of the liquid $SO_2$ contained in extract or unsaturates, the untreated mineral oil is passed counter-currently to a descending stream of liquid $SO_2$ in the mixer. The liquid $SO_2$ dissolves the unsaturated hydrocarbons of the oil and settles to the bottom as a heavy liquid, known as unfinished extract, which consists of four to five parts of liquid $SO_2$ to each part of unsaturates. The raffinate, together with a small amount of liquid $SO_2$, is drawn off at the top of the mixer.

The extract and liquid $SO_2$ from the bottom of the mixer is pumped into a pressure evaporator constructed, for example, as shown in Fig. 1 and already described in connection therewith. The form shown in Fig. 2 may also be used, or any other form constructed to carry out my process for separating and recovering $SO_2$. The evaporator is operated at a pressure (generally 3—4 atm.) such that the $SO_2$ gas evolved therefrom may be condensed at cooling water temperatures.

The mixture, entering by pipe 21, is conducted successively through heating members 9, communicating with the common container or cylinder 10 in which the $SO_2$ gas evolved from the heated liquid is collected. The $SO_2$ gas is conducted from dome 23 to condenser 33.

The extract, containing a small amount of $SO_2$ which was not driven off in the pressure evaporator, leaves the latter by pipe 20, controlled by relief valve 19, and enters a vacuum evaporator where further heating takes place. A gas pump sucks off the $SO_2$ gas which is evolved and compresses it to condenser pressure, forcing it into condenser 33 where it is condensed, along with the $SO_2$ gas from the pressure evaporator, by being placed in heat transfer relation with cooling water.

The finished extract, substantially free from $SO_2$, is drawn from the vacuum evaporator by a pump and made use of as desired.

The liquid $SO_2$ from the condenser is collected in a storage tank, which is maintained at condenser pressure by being in direct communication with the condenser. The liquid $SO_2$ can be drawn off as desired and reused in the mixer. The storage tank is at greater pressure than the mixer and hence the liquid $SO_2$ will flow from the former to the latter without the use of a pump, the flow being controlled by relief valve 34.

My invention obviously is not restricted to the particular embodiments thereof herein illustrated and described.

It is obvious that the process is applicable to liquid mixtures containing other normally gaseous volatile solvents in predominating amount such that the volume of gaseous solvent given off upon heating is so large as to interfere with the further heating of the mixture.

What I claim and desire to secure by Letters Patent, is:

1. A process of evaporating and recovering sulphur dioxide from mixtures of liquid hydrocarbons and $SO_2$ with predominating percentage of $SO_2$ under pressure, consisting in subjecting the mixture to a stepwise increasing heating under a sustained pressure and separating and condensing under said pressure the $SO_2$ gas evolved by this heating from the liquid in each heating step.

2. The process as specified in claim 1 consisting in passing the mixture through a plurality of externally heated containers connected in series and heated in stages, separating the $SO_2$ gas evolved in each stage upon the liquid passing from one stage to the next one, and condensing these gases by cooling under pressure.

3. A process of separating $SO_2$ in the form of gas from mixtures of liquid hydrocarbons containing predominating proportions of liquid $SO_2$ by sustained pressure and heat comprising repeated heating of the mixture in successive stages under sustained pressure and removing the $SO_2$ gas produced in each stage before subjecting the remaining mixture to treatment in the following stage.

4. The process of separating liquid sulphur dioxide by vaporization from mixtures thereof with liquid hydrocarbons in which the volume of liquid sulphur dioxide predominates, which consists in forcing the mixture under a sustained pressure, due to the vaporization, through a series of alternate heating and separating containers; allowing the sulphur dioxide gas evolved in each heating container to separate itself from the liquid in the next following separating container, so that the remaining liquid can be raised to a higher temperature in the next following heating container; and liquefying the gas, as evolved, by cooling in another container while still under the sustained pressure due to the vaporization.

In testimony whereof, I have signed my name to this specification.

PAUL JODECK.